US008540900B2

(12) United States Patent
Foley et al.

(10) Patent No.: US 8,540,900 B2
(45) Date of Patent: Sep. 24, 2013

(54) INTERMEDIATE TRANSFER BELTS

(75) Inventors: Geoffrey M. T. Foley, Fairport, NY (US); Jin Wu, Pittsford, NY (US); Satchidanand Mishra, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 689 days.

(21) Appl. No.: 12/731,449

(22) Filed: Mar. 25, 2010

(65) Prior Publication Data

US 2011/0233475 A1 Sep. 29, 2011

(51) Int. Cl.
*H01B 1/00* (2006.01)
*B32B 3/00* (2006.01)
*G03G 15/20* (2006.01)

(52) U.S. Cl.
USPC ............................ 252/500; 428/206; 399/308

(58) Field of Classification Search
USPC .......... 252/500; 399/176, 286, 308; 428/206
See application file for complete search history.

(56) References Cited

U.S. PATENT DOCUMENTS 6,327,454 B1 * 12/2001 Yuan et al. .................... 399/303
7,103,304 B2 * 9/2006 Hara ............................ 399/176
2007/0286957 A1 * 12/2007 Suzuki et al. .............. 427/372.2
2009/0010690 A1 * 1/2009 Kanesugi et al. ............. 399/336
2009/0231406 A1 * 9/2009 Yamashita et al. ............ 347/103
2010/0014891 A1 * 1/2010 Sakata .......................... 399/176
2010/0245511 A1 * 9/2010 Ageishi ......................... 347/102
2011/0105658 A1 * 5/2011 Wu .............................. 524/145

FOREIGN PATENT DOCUMENTS

WO WO 2008/044502 * 4/2008

* cited by examiner

*Primary Examiner* — Mark Kopec
*Assistant Examiner* — Jaison Thomas
(74) *Attorney, Agent, or Firm* — MH2 Technology Law Group LLP

(57) ABSTRACT

Provided are coating compositions for imaging components, methods of forming imaging components, and imaging components such as, for example, intermediate transfer belts, transfer belts, bias charge rolls, bias transfer rolls, and a magnetic roller sleeve. An exemplary imaging component can include an ultraviolet (UV) cured composite, the UV cured composite including a plurality of conductive species substantially uniformly dispersed in a UV cured acrylate polymer, wherein each of the plurality of conductive species can be selected from a group consisting of salts of organic sulfonic acid, esters of phosphoric acid, esters of fatty acids, ammonium salts, and phosphonium salts, and wherein the UV cured composite can have a surface resistivity in the range of about $10^7$ Ω/square to about $10^{13}$ Ω/square.

20 Claims, 2 Drawing Sheets

INTERMEDIATE TRANSFER BELTS

DETAILED DESCRIPTION

1. Field of Use

The present teachings relate generally to intermediate transfer members used for electrostatographic devices and, more particularly, to ultraviolet (UV) cured intermediate transfer members and methods of making them.

2. Background

In an electrophotographic imaging process, an electric field can be created by applying a bias voltage to the electrophotographic imaging components, consisting of resistive coatings and/or layers. Further, the coatings and material layers are subjected to a bias voltage such that an electric field can be created in the coatings and material layers when the bias voltage is ON and be sufficiently electrically relaxable when the bias voltage is OFF so that electrostatic charges do not accumulate after an electrophotographic imaging process. The fields created are used to manipulate an unfused toner image along the paper path, for example from photoreceptor to an intermediate transfer belt and from the intermediate transfer belt to paper, before fusing to form the fixed images. These electrically resistive coatings and material layers are typically required to exhibit resistivity in a range of about $10^7$ to about $10^{12}$ ohm/square and should possess mechanical and/or surface properties suitable for a particular application or use on a particular component. It has been difficult to consistently achieve the desired range of properties with known coating materials.

Conventional materials for intermediate transfer belts include conductive powders dispersed in either thermoplastic polyimide resins or thermosetting polyimide resins. The conductive powders include carbon black, acetylene black, polyaniline, stannic oxide, indium oxide, tin oxide, titanium oxide, antimony tin oxide, indium tin oxide, zinc oxide, potassium titanate, and other types of conductive/semi-conductive powders. However, controlling uniformity of electrical resistivity and other properties is a challenge in the polyimide-based intermediate transfer belts, due to variations in powder size, in powder concentration, and in milling process during the belt formation.

Thus, there is a need to overcome these and other problems of the prior art and to provide new material compositions and methods of making intermediate transfer members.

SUMMARY

In accordance with various embodiments, there is a coating composition for imaging components. The coating composition can include an ultraviolet (UV) curable resin, one or more photoinitiators, and a plurality of conductive species substantially uniformly dispersed in the UV curable resin. The UV curable resin can include one or more of monomeric acrylates, monomeric vinyls, and oligomeric acrylates. Each of the plurality of conductive species can be selected from a group consisting of salts of organic sulfonic acid, esters of phosphoric acid, esters of fatty acids, ammonium salts, and phosphonium salts.

In accordance with various embodiments, there is an imaging component. The imaging component can include an ultraviolet (UV) cured composite, the UV cured composite including a plurality of conductive species substantially uniformly dispersed in a UV cured acrylate polymer, wherein each of the plurality of conductive species can be selected from a group consisting of salts of organic sulfonic acid, esters of phosphoric acid, esters of fatty acids, ammonium salts, and phosphonium salts, and wherein the UV cured composite can have a surface resistivity in the range of about $10^7$ Ω/square to about $10^{13}$ Ω/square.

According to yet another embodiment, there is an intermediate transfer member having a first surface and a second surface and having substantially uniform volume and surface resistivities throughout the first surface and the second surface, wherein the first surface and the second surface have a volume resistivity of from about $10^7$ Ωm to about $10^{14}$ Ωm and a surface resistivity of from about $10^7$ Ω/square to about $10^{13}$ Ω/square.

Additional advantages of the embodiments will be set forth in part in the description which follows, and in part will be obvious from the description, or may be learned by practice of the present teachings. The advantages will be realized and attained by means of the elements and combinations particularly pointed out in the appended claims.

It is to be understood that both the foregoing general description and the following detailed description are exemplary and explanatory only and are not restrictive of the present teachings, as claimed.

The accompanying drawings, which are incorporated in and constitute a part of this specification, illustrate embodiments of the present teachings and together with the description, serve to explain the principles of the present teachings.

It should be noted that some details of the FIGS. have been simplified and are drawn to facilitate understanding of the embodiments rather than to maintain strict structural accuracy, detail, and scale.

DESCRIPTION OF THE EMBODIMENTS

Reference will now be made in detail to the present embodiments, examples of which are illustrated in the accompanying drawings. Wherever possible, the same reference numbers will be used throughout the drawings to refer to the same or like parts.

Notwithstanding that the numerical ranges and parameters setting forth the broad scope of the present teachings are approximations, the numerical values set forth in the specific examples are reported as precisely as possible. Any numerical value, however, inherently contains certain errors necessarily resulting from the standard deviation found in their respective testing measurements. Moreover, all ranges disclosed herein are to be understood to encompass any and all sub-ranges subsumed therein. For example, a range of "less than 10" can include any and all sub-ranges between (and including) the minimum value of zero and the maximum value of 10, that is, any and all sub-ranges having a minimum value of equal to or greater than zero and a maximum value of equal to or less than 10, e.g., 1 to 5. In certain cases, the numerical values as stated for the parameter can take on negative values. In this case, the example value of range stated as "less that 10" can assume negative values, e.g. −1, −2, −3, −10, −20, −30, etc.

Figure 1:
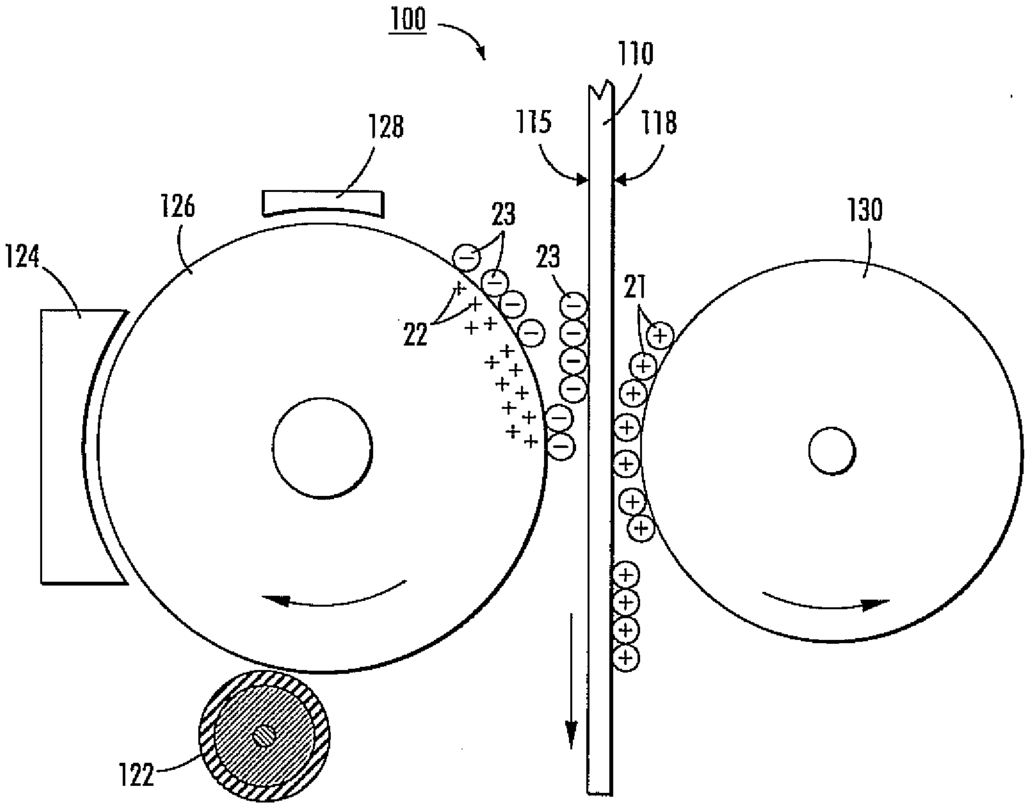
FIG. 1 schematically illustrates an exemplary electrostatographic apparatus, in accordance with various embodiments of the present teachings.

FIG. 1 is a schematic of an exemplary apparatus 100 for forming an image in accordance with the present teachings. In various embodiments, the apparatus 100 can be a multi-imaging system. As shown, the apparatus 100 can include an image receiving member 126 and a charging station 122 for uniformly charging a surface of the image receiving member 126. The image receiving member 126 can be exemplified by a photoreceptor drum as shown in FIG. 1, although other appropriate imaging members, for example, other electrostatographic imaging receptors such as ionographic belts and drums, or electrophotographic belts, can also be used for the apparatus 100. The charging station 122 can include any suitable charger such as a corotron, a scorotron or a bias charge roll. The apparatus 100 can also include an imaging station 124 where an original document (not shown) can be exposed to a light source (also not shown) for forming a latent image on the image receiving member 126, a developing station 128 for converting the latent image to a visible image on the image receiving member 126, an intermediate transfer member 110 positioned between the image receiving member 126 and a transfer roller 130 for transferring the developed image from the image receiving member 126 to a media. It should be readily apparent to one of ordinary skill in the art that the apparatus 100 depicted in FIG. 1 represents a generalized schematic illustration and that other members/stations/transfer means can be added or existing members/stations/transfer means can be removed or modified.

As shown in FIG. 1, the intermediate transfer member 110 can have a first surface 115 proximate to the image receiving member 126 and a second surface 118 proximate to the transfer roller 130. In some embodiments, the intermediate transfer member 110 can have a substantially uniform volume and surface resistivities throughout the first surface 115 and the second surface 118. In other embodiments the first surface 115 and the second surface 118 can have a volume resistivity of from about $10^7$ Ωm to about $10^{14}$ Ωm or from about $10^8$ Ωm to about $10^{13}$ Ωm or from about $10^9$ Ωm to about $10^{12}$ Ωm. In some other embodiments, the first surface and the second surface can have a surface resistivity of from about $10^7$ Ω/square to about $10^{13}$ Ω/square or from about $10^8$ Ω/square to about $10^{12}$ Ω/square or from about $10^9$ Ω/square to about $10^{11}$ Ω/square.

Generally, in an electrostatographic reproducing apparatus, a light image of an original to be copied can be recorded in the form of an electrostatic latent image upon a photosensitive member (e.g., the image receiving member 126) and the latent image can be subsequently rendered visible by the application of electroscopic thermoplastic resin particles which are commonly referred to as toner.

Referring to FIG. 1, the image receiving member 126 can be charged by the charging station 122 and can be imagewisely exposed to light from an optical system or an image input apparatus (e.g., 124) to form an electrostatic latent image thereon. The electrostatic latent image can then be developed by bringing a developer mixture (including toner) from the developing station 128 into contact therewith, resulting in a developed image. The developed image can then be transferred to the intermediate transfer member 110 and subsequently transferred to, a media, for example, a copy sheet (not shown) having a permanent image thereon.

Subsequent to the image development, the charged toner particles 23 from the developing station 128 can be attracted and held by the image receiving member 126 (e.g., photoreceptor drum), because the photoreceptor drum possesses a charge 22 opposite to that of the toner particles 23. It is noted in FIG. 1 that the toner particles 23 are shown as negatively charged and the photoreceptor drum 126 is shown as positively charged. In various embodiments, these charges can be reversed, depending on the nature of the toner and the machinery being used. In an exemplary embodiment, the toner can be present as a liquid developer. However, one of ordinary skill in the art will understand that the apparatus 100 can also be useful for dry development systems. After the toner particles have been deposited on the photoconductive surface of the image receiving member 126, the developed image can be transferred to the intermediate transfer member 110.

In this manner, in a multi-image system for example, each of the images can be formed on the exemplary photoreceptor drum (see 126) by the image input apparatus 124, developed sequentially by the developing station 128, and transferred to the intermediate transfer member 110, when each image involves a liquid image. In an alternative method, each image can be formed on the photoreceptor drum, developed, and transferred in registration to the intermediate transfer member 110, when each image involves a dry image.

In an exemplary embodiment, the multi-image system can be a color copying system. In this color copying system, each color of an image being copied can be formed on the photoreceptor drum (see 126). Each color image can be developed and transferred to the intermediate transfer member 110. In an alternative method, each color of an image can be formed on the photoreceptor drum (see 126), developed, and transferred in registration to the intermediate transfer member 110.

The transfer roller 130 can be positioned opposite to the photoreceptor drum 126 having the intermediate transfer member 110 there between. The transfer roller 130 can be a biased transfer roller having a higher voltage than the surface of the photoreceptor drum. The biased transfer roller 130 can charge the second surface 118 of the intermediate transfer member 110 with, for example, a positive charge. Alternatively, a corona or any other charging mechanism can be used to charge the second surface 118 of the intermediate transfer member 110. Meanwhile, the negatively charged toner particles 23 can be attracted to the first surface 115 of the intermediate transfer member 110 by the exemplary positive charge 21 on the second surface 118 of the intermediate transfer member 110.

After the toner latent image has been transferred from the image receiving member 126, exemplary photoreceptor drum to the intermediate transfer member 110, the intermediate transfer member 110 can be contacted under heat and pressure to an image receiving substrate, i.e. a media (not shown). The toner image on the intermediate transfer member 110 can then be transferred and fixed (as permanent image) to the media (not shown) such as a copy sheet.

Figure 2:
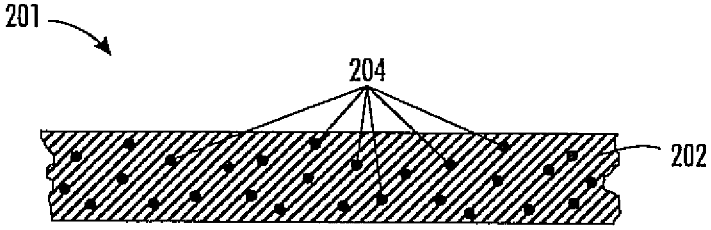
FIG. 2 schematically illustrates an exemplary ultraviolet (UV) cured composite for imaging components in accordance with various embodiments of the present teachings.

The intermediate transfer member 110 and the bias transfer roll 130 can include the ultraviolet (UV) cured composite 201 shown in FIG. 2. In various embodiments, the intermediate transfer member 150 can be of any suitable configuration, such as, for example, a sheet, a film, a web, a foil, a strip, a coil, a cylinder, a drum, a roller, an endless strip, a circular disc, a belt including an endless belt, an endless seamed flexible belt, an endless seamless flexible belt, an endless belt having a puzzle cut seam, and the like. For example, the intermediate transfer member 110 can be an endless seamed flexible belt or seamed flexible belt.

Referring back to FIG. 2, in accordance with various embodiments of the present teachings, FIG. 2 schematically illustrates a cross sectional view of a portion of an exemplary UV cured composite 201 for imaging components, such as, for example, intermediate transfer member 110 and the bias transfer roll 130. The UV cured composite 201 can include a plurality of conductive species 204 substantially uniformly dispersed in a UV cured polymer 202, as shown in FIG. 2. In various embodiments, each of the plurality of conductive species 204 can include one or more salts of organic sulfonic acid, esters of phosphoric acid, esters of fatty acids, ammonium salts, and phosphonium salts. In various embodiments, the plurality of conductive species 204 can be present in the UV cured polymer 202 in an amount ranging from about 0.1% to about 30% or from about 1% to about 20% or from about 5% to about 15% by weight of the total weight of the UV cured composite composition. In various embodiments, the UV cured composite 201 can have a surface resistivity in the range of about $10^7$ Ω/square to about $10^{13}$ Ω/square or from about $10^8$ Ω/square to about $10^{12}$ Ω/square, or from about $10^9$ Ω/square to about $10^{11}$ Ω/square. In some cases, the UV cured composite 201 can have a volume resistivity in the range of about $10^7$ Ωm to about $10^{14}$ Ωm, in other cases in the range of about $10^8$ Ωm to about $10^{13}$ Ωm, and in some other cases in the range of about $10^9$ Ωm to about $10^{12}$ Ωm. In various embodiments, the UV cured composite 201 can have a modulus in the range of about 500 MPa to about 3,000 MPa or from about 600 MPa to about 2,800 MPa or from about 700 MPa to about 2,500 MPa.

In various embodiments, the UV cured composite 201 can be formed from a coating composition including an ultraviolet (UV) curable resin, the UV curable resin including one or more of monomeric acrylates, monomeric vinyls, and oligomeric acrylates, and one or more photoinitiators. The coating composition can also include a plurality of conductive species substantially uniformly dispersed in the UV curable resin, wherein each of the plurality of conductive species can include one or more of salts of organic sulfonic acid, esters of phosphoric acid, esters of fatty acids, ammonium salts, and phosphonium salts. In various embodiments, the plurality of conductive species can be substantially miscible or soluble in the UV curable resins. In certain embodiments, the plurality of conductive species can be present in an amount ranging from about 0.1% to about 30% or in some cases from about 1% to about 20% or in some other cases from about 5% to about 15% by weight of the total weight of the coating composition.

Exemplary salts of organic sulfonic acid include, but are not limited to, sodium sec-alkane sulfonate (ARMOSTAT® 3002 from AKZO Nobel Polymer Chemicals LLC, Chicago, Ill.) and sodium C10-C18-alkane sulfonate (HOSTASTAT® HS1FF from Clariant Corporation, Charlotte, N.C.). Exemplary esters of phosphoric acid include, but are not limited to, STEPFAC® 8180, 8181, 8182 (phosphate esters of alkyl polyethoxyethanol), 8170, 8171, 8172, 8173, 8175 (phosphate esters of alkylphenoxy polyethoxyethanol), POLYSTEP® P-11, P-12, P-13 (phosphate esters of tridecyl alcohol ethoxylates), P-31, P-32, P-33, P-34, P-35 (phosphate esters of alkyl phenol ethoxylates), all available from Stepan Corporation, Northfield, Ill. Exemplary esters of fatty acids include, but are not limited to, Glycerol fatty acid ester, HOSTASTAT® FE20liq available from Clariant Corporation, Charlotte, N.C. Exemplary ammonium or phosphonium salts include, but are not limited to, benzalkonium chloride, N-benzyl-2-(2,6-dimethylphenylamino)-N,N-diethyl-2-oxoethanaminium benzoate, cocamidopropyl betaine, hexadecyltrimethylammonium bromide, methyltrioctylammonium chloride, and tricaprylylmethylammonium chloride, behentrimonium chloride (docosyltrimethylammonium chloride), tetradecyl(trihexyl)phosphonium chloride, tetradecyl(trihexyl)phosphonium decanoate, trihexyl(tetradecyl)phosphonium bis 2,4,4-trimethylpentylphosphinate, tetradecyl(trihexyl)phosphonium dicyanamide, triisobutyl (methyl)phosphonium tosylate, tetradecyl(trihexyl) phosphonium bistriflamide, tetradecyl(trihexyl) phosphonium hexafluorophosphate, tetradecyl(trihexyl) phosphonium tetrafluoroborate, ethyl tri(butyl)phosphonium diethylphosphate, etc.

The coating composition can also include any suitable oilgomeric acrylate such as, for example, urethane acrylates, polyester acrylates, epoxy acrylates, polyether acrylates, olefin acrylates, and the like. In various embodiments, the oilgomeric acrylates can have a molecular weight ranging from several hundreds to several thousands or even higher. For example, the molecular weight of the oilgomeric acrylates can range from about 300 to about 5,000, or from about 500 to about 3,000, or from about 700 to about 2,500. In some embodiments, the exemplary oilgomeric acrylates can have a glass transition temperature ($T_g$) of from about −80° C. to about 200° C., or from about −40° C. to about 150° C., or from about 0° C. to about 100° C.

Specific examples of the aromatic urethane acrylates can include CN2901 an aromatic urethane triacrylate oligomer ($T_g$=35° C.); CN2902 an aromatic urethane triacrylate oligomer ($T_g$=25° C.); CN9782 a difunctional aromatic urethane acrylate oligomer; CN9783 a difunctional aromatic urethane acrylate oligomer; CN992 an aromatic polyester based urethane diacrylate oligomer; CN994 an aromatic urethane acrylate oligomer ($T_g$=50° C.); CN999 a low viscosity aromatic urethane oligomer ($T_g$=97° C.); CN997 a hexafunctional aromatic urethane acrylate oligomer; CN2600 a brominated aromatic urethane acrylate oligomer ($T_g$=88.8° C.); CN902J75 a brominated urethane acrylate oligomer containing 25% isobornyl acrylate; CN975 a hexafunctional aromatic urethane acrylate oligomer ($T_g$=−12° C.); CN978 an aromatic polyether based urethane diacrylate oligomer ($T_g$=−40° C.); CN972 an aromatic polyether based urethane triacrylate oligomer (Tg=−47° C.); CN9022 a urethane acrylate ester ($T_g$=−16° C.), all available from Sartomer Company Inc., (Exton, Pa.); and LAROMER® UA 9031V, available from BASF (Ludwigshafen, Germany).

Specific examples of the aliphatic urethane acrylates can include CN9002 a difunctional aliphatic urethane acrylate oligomer; CN9004 a difunctional aliphatic urethane acrylate oligomer; CN9005 a difunctional aliphatic urethane acrylate oligomer ($T_g$=−10° C.); CN9006 a hexafunctional aliphatic urethane acrylate oligomer ($T_g$=83° C.); CN9007 a difunctional aliphatic urethane acrylate oligomer; CN9178 a difunctional aliphatic urethane acrylate oligomer; CN9290US a difunctional aliphatic urethane acrylate oligomer ($T_g$=−28° C.); CN940 a difunctional aliphatic urethane oligomer; CN9788 a difunctional aliphatic urethane oligomer; CN989 a trifunctional aliphatic urethane acrylate oligomer; CN9893 a difunctional aliphatic urethane oligomer; CN996 a urethane acrylate oligomer; CN9009 an aliphatic urethane acrylate oligomer ($T_g$=40° C.); CN9010 an aliphatic urethane acrylate oligomer ($T_g$=103° C.); CN3211 an aliphatic urethane acrylate oligomer; CN9001 an aliphatic urethane acrylate oligomer ($T_g$=60° C.); CN2920 an aliphatic urethane acrylate oligomer ($T_g$=59° C.); CN9011 an aliphatic urethane oligomer; CN929 a trifunctional aliphatic polyester urethane acrylate oligomer ($T_g$=17° C.); CN962 an aliphatic polyester based urethane diacrylate oligomer ($T_g$=−38° C.); CN965 an aliphatic polyester based urethane diacrylate oligomer ($T_g$=−37° C.); CN991 an aliphatic polyester based urethane diacrylate oligomer; CN980 a urethane acrylate oligomer ($T_g$=−29° C.); CN-981 an aliphatic polyester/polyether based urethane diacrylate oligomer ($T_g$=22° C.); CN964 an aliphatic polyester based urethane diacrylate oligomer ($T_g$=−24° C.); CN968 an aliphatic polyester based urethane hexaacrylate oligomer ($T_g$=34° C.); CN983 an aliphatic polyester based urethane diacrylate oligomer; CN984 an aliphatic polyester based urethane diacrylate oligomer; CN9008 a trifunctional aliphatic polyester urethane acrylate oligomer ($T_g$=111° C.); CN9024 an aliphatic urethane acrylate; CN9013 a multifunctional urethane acrylate oligomer ($T_g$=143° C.); CN9014, an aliphatic urethane acrylate oligomer ($T_g$=−41° C.), all available from Sartomer Company, Inc., (Exton, Pa.); and LAROMER® UA 19T, UA 9028V, UA 9030V, LR 8987, UA 9029V, and UA 9033V, all available from BASF (Ludwigshafen, Germany).

In various embodiments, the UV curable resin of the coating composition can further include monomeric acrylates or monomeric vinyls, which can be admixed with oligomeric urethane acrylates. For example, monomeric acrylates or vinyls can function as co-reactants, and/or as diluents in the formulation so as to adjust the system viscosity. Exemplary monomeric acrylate and monomeric vinyls include, but are not limited to, trimethylolpropane triacrylate, hexandiol diacrylate, tripropyleneglycol diacrylate, dipropyleneglycol diacrylate, triethyleneglycol divinyl ether, vinyl caprolactam, n-vinyl formamide and a Combination thereof.

In various embodiments, the monomeric acrylates or vinyls can include, for example, LAROMER® TMPTA (trimethylolpropane triacrylate), BDDA (butandiol diacrylate), HDDA (hexandiol diacrylate), TPGDA (tripropyleneglycol diacrylate), DPGDA (dipropyleneglycol diacrylate), POEA (phenoxyethyl acrylate), LR8887 (trimethylolpropaneformal monoacrylate), TBCH (4-t-butylcyclohexyl acrylate), LA (lauryl acrylate 12/14), EDGA (ethyldiglycol acrylate), BDMA (butandiol monoacrylate), DCPA (d ihydrodicyclopentadienyl acrylate), DVE-3 (triethyleneglycol divinyl ether), vinyl caprolactam, n-vinyl formamide, all available from BASF; and CN4000 (fluorinated acrylate oligomer), available from Sartomer Co. (Warrington, Pa.), and their combinations.

In various embodiments, the coating composition can further include any suitable one or more photoinitiators, for example, a photoinitiator for a surface curing of the UV curable resin, a photoinitiator for a bulk curing through the UV curable resin, and combinations thereof. Furthermore, the one or more photoinitiators can be in any suitable form, for example, crystalline powders and/or a liquid. In an exemplary embodiment, combined photoinitiators i.e. photoinitators for surface curing and bulk curing, can be used to initiate the curing process to form an exemplary UV cured composite 201 as shown in FIG. 2. The one or more photoinitiator can be present in the coating composition in any amount sufficient to initiate the curing of the UV curable resin. In certain embodiments, the one or more photoinitiators can be present in an amount ranging from about 0.5% to about 10%, or from about 1% to about 7%, or from about 2% to about 5% by weight of the coating composition or by weight of UV cured composite 201 as shown in FIG. 2.

Any suitable photoinitiators can be used including, but not limited to, acyl phosphines, α-hydroxyketones, benzyl ketals, α-aminoketones, and mixtures thereof.

Examples of the acyl phosphine photoinitiators can include mono acyl phosphine oxide (MAPO) such as DAROCUR® TPO; and bis-acyl phosphine oxide (BAPO) such as IRGACURE® 819, both available from Ciba Specialty Chemicals (Tarrytown, N.Y.).

Specific examples of the acyl phosphine photoinitiators can include diphenyl(2,4,6-trimethylbenzoyl)phosphine oxide (DAROCUR® TPO), diphenyl(2,4,6-trimethylbenzoyl)phosphine oxide (ESACURE® TPO, LAMBERTI Chemical Specialties, Gallarate, Italy), diphenyl(2,4,6-trimethylbenzoyl)phosphine oxide (FIRSTCURE® HMPP available from Albemarle Corporation, Baton Rouge, La.), diphenyl(2,4,6-trimethylbenzoyi)phosphine oxide (LUCIRIN® TPO, available from BASF (Ludwigshafen, Germany), diphenyl(2,4,6-trimethylbenzoyl)phosphinate (LUCIRIN® TPO-L), and phenyl bis(2,4,6-trimethyl benzoyl)phosphine oxide (IRGACURE® 819, available from Ciba Specialty Chemicals, Tarrytown, N.Y.).

Examples of the α-hydroxyketone photoinitiators can include 1-hydroxy-cyclohexylphenyl ketone (IRGACURE® 184), 2-hydroxy-2-methyl-1-phenyl-1-propanone (DAROCUR® 1173), and 2-hydroxy-1-[4-(2-hydroxyethoxy)phenyl]-2-methyl-1-propanone (IRGACURE® 2959), all available from Ciba Specialty Chemicals (Tarrytown, N.Y.).

Examples of the α-aminoketones photoinitiators can include 2-benzyl-2-(dimethylamino)-1-[4-(4-morpholinyl) phenyl]-1-butanone (IRGACURE® 369), and 2-methyl-1-[4-(methylthio)phenyl]-2-(4-morpholinyl)-1-propanone (IRGACURE® 907), both available from Ciba Specialty Chemicals (Tarrytown, N.Y.).

Examples of the benzyl ketal photoinitiators can include α,α-dimethoxy-α-phenylacetophenone (IRGACURE® 651), available from Ciba Specialty Chemicals (Tarrytown, N.Y.).

In various embodiments, the coating composition can be prepared by, for example, by first mixing the plurality of conductive species in a liquid UV curable resin including one or more of monomeric acrylates, monomeric vinyls, and oligomeric acrylates until dissolved, and then adding the one or more photoinitiators to form a coating solution. The coating solution can then be coated over a substrate or a temporary substrate followed by a UV curing to form a UV cured composite, such as, for example the UV cured composite 201 for imaging components as shown in FIG. 2. Any suitable coating technique can be used, including, but not limited to, extrusion die, draw bar coating, spray coating, dip coating, brush coating, roller coating, spin coating, casting, and flow coating. In some embodiments, a release layer can be deposited over the substrate before the step of applying the coating solution over the substrate. In some embodiments, the UV cured composite can be peeled off or removed from the temporary substrate to form a free standing UV cured composite 201. In some embodiments, the UV-cured composite 201 can be a seamless belt, or welded, for example, through ultrasound welding to form an exemplary imaging component, such as, for example, intermediate transfer belt.

Depending on the UV curable resins and photoinitiators used, the coated coating solution can be UV cured at a wavelength, for example, ranging from about 200 nm to about 400 nm, including from about 240 nm to about 370 nm, or from about 270 nm to about 340 nm.

In various embodiments, the UV cured composite 201, as shown in FIG. 2 can have a thickness ranging from about 1 μm to about 500 μm, from about 20 μm to about 300 μm, or from about 50 μm to about 150 μm, although the UV cured composite 201 can have any other suitable thickness.

The UV cured composite 201 shown in FIG. 2 can be used for any suitable imaging components of electrostatographic devices and electrophotographic devices. Exemplary imaging components can include, but are not limited to a bias charge roll, a bias transfer roll, a magnetic roller sleeve, an intermediate transfer belt, and a transfer belt. In various embodiments, the imaging components can have single layer configuration with only UV cured composite 201 as shown in FIG. 2 or a multi layer configuration, as shown in FIGS. 3 and 4.

Figure 3:
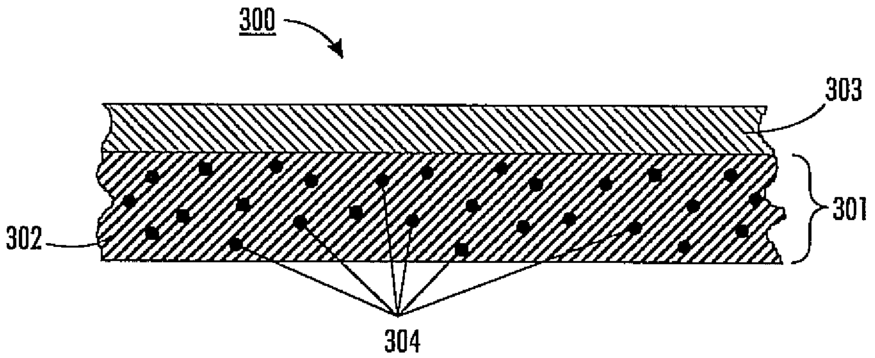
FIG. 3 schematically illustrates a cross sectional view of a portion of an exemplary imaging component in accordance with various embodiments of the present teachings.

FIG. 3 schematically illustrates a cross sectional view of a portion of an exemplary imaging component 300, such as, for example, the intermediate transfer member 110 and the biased transfer roller 130 shown in FIG. 1. The exemplary imaging component 300 can include an outer release layer 303 disposed over an exemplary UV cured composite 301. In various embodiments, the UV cured composite 301 can include a plurality of conductive species 304 substantially uniformly dispersed in a UV cured polymer 302, wherein the UV cured composite 301 can have a surface resistivity in the range of about $10^7$ Ω/square to about $10^{13}$ Ω/square or from about $10^8$ Ω/square to about $10^{12}$ Ω/square, or from about $10^9$ Ω/square to about $10^{11}$ Ω/square. In some cases, the UV cured composite 301 can have a volume resistivity in the range of about $10^7$ Ωm to about $10^{14}$ Ωm, in other cases in the range of about $10^8$ Ωm to about $10^{13}$ Ωm, and in some other cases in the range of about $10^9$ Ωm to about $10^{12}$ Ωm. In various embodiments, each of the plurality of conductive species 304 can include one or more of salts of organic sulfonic acid, esters of phosphoric acid, esters of fatty acids, ammonium salts, and phosphonium salts. In various embodiments, the UV cured composite 301 of the imaging component 300 can be in the form of at least one of a sheet, a belt, a film, or a cylindrical roll.

Figure 4:
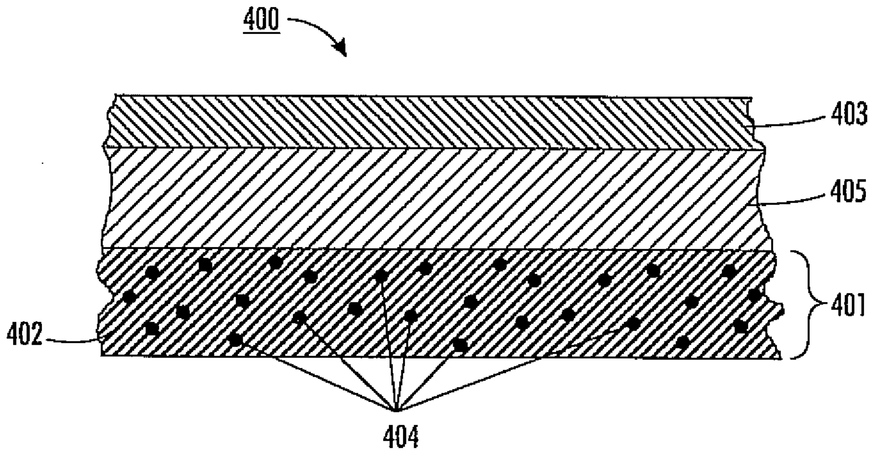
FIG. 4 schematically illustrates a cross sectional view of a portion of another exemplary imaging component in accordance with various embodiments of the present teachings.

FIG. 4 schematically illustrates a cross sectional view of a portion of another exemplary imaging component 400, such as, for example, the intermediate transfer member 110 and the bias charge roll 122 shown in FIG. 2. The exemplary imaging component 400 can include a conductive layer 401 including the exemplary UV cured composite, a conformable layer 405 disposed over the conductive layer 401, and an outer release layer 403 disposed over the conformable layer 405. In various embodiments, the UV cured composite 401 can include a plurality of conductive species 404 substantially uniformly dispersed in the UV cured polymer 402, wherein the UV cured composite 401 can have a surface resistivity in the range of about $10^7$ Ω/square to about $10^{13}$ Ω/square or from about $10^8$ Ω/square to about $10^{12}$ Ω/square, or from about $10^9$ Ω/square to about $10^{11}$ Ω/square. In some cases, the UV cured composite 201 can have a volume resistivity in the range of about $10^7$ Ωm to about $10^{14}$ Ωm, in other cases in the range of about $10^8$ Ωm to about $10^{13}$ Ωm, and in some other cases in the range of about $10^9$ Ωm to about $10^{12}$ Ωm. In various embodiments, each of the plurality of conductive species 404 can include one or more of salts of organic sulfonic acid, esters of phosphoric acid, esters of fatty acids, ammonium salts, and phosphonium salts.

The conformable layer 405 can include any suitable material including, but not limited to, one or more of a silicone, a fluorosilicone, or a fluorelastomer. Exemplary materials for the compliant layer can include, but are not limited to, silicone rubbers such as room temperature vulcanization (RTV) silicone rubbers; high temperature vulcanization (HTV) silicone rubbers; and low temperature vulcanization (LTV) silicone rubbers. Exemplary commercially available silicone rubbers include, but is not limited to, SILASTIC® 735 black RTV and SILASTIC® 732 RTV (Dow Corning Corp., Midland, Mich.); and 106 RTV Silicone Rubber and 90 RTV Silicone Rubber (General Electric, Albany, N.Y.). Other suitable silicone materials include, but are not limited to, Sylgard® 182 (Dow Corning Corp., Midland, Mich.). siloxanes (preferably polydimethylsiloxanes); fluorosilicones such as Silicone Rubber 552 (Sampson Coatings, Richmond, Va.); dimethylsilicones; liquid silicone rubbers such as, vinyl crosslinked heat curable rubbers or silanol room temperature crosslinked materials; and the like. In some cases, the conformable layer 40 can have a thickness ranging from about 1 μm to about 1000 μm, from about 10 μm to about 500 μm, or from about 50 μm to about 200 μm.

In various embodiments, the outer release layer 303, 403 as shown in FIGS. 3 and 4 can have a thickness ranging from about 2 μm to about 1500 μm, or from about 25 μm to about 1000 μm, or from about 75 μm to about 500 μm. The outer release layer 303, 403 can include any suitable low surface energy material, such as, for example, fluoropolymers including fluoroplastics and fluoroelastomers.

Examples of the fluoropolymers can include fluoroplastics and/or fluoroelastomers. Fluoroplastics can include, for example, TEFLON®-like materials such as, fluorinated ethylene propylene copolymer (FEP), polytetrafluoroethylene (PTFE), and/or polyfluoroalkoxy polytetrafluoroethylene (PFA TEFLON®). Examples of the fluoroelastomers can include, for example, copolymers and terpolymers of vinylidenefluoride, hexafluoropropylene, and tetrafluoroethylene, which are commercially known under various designations as VITON A®, VITON E®, VITON E60C®, VITON E45®, VITON E430®, VITON B910®, VITON GH®, VITON B50®, VITON E45®, and VITON GF®. The VITON® designation is a Trademark of E.I. DuPont de Nemours, Inc Wilmington, Del. Among those, two known fluoroelastomers can include (1) a class of copolymers of vinylidenefluoride, hexafluoropropylene, and tetrafluoroethylene, known commercially as VITON A®; (2) a class of terpolymers of vinylidenefluoride, hexafluoropropylene, and tetrafluoroethylene, known commercially as VITON B®; and (3) a class of tetrapolymers of vinylidenefluoride, hexafluoropropylene, tetrafluoroethylene, and a cure site monomer, such as VITON GF®, having 35 mole percent of vinylidenefluoride, 34 mole percent of hexafluoropropylene, and 29 mole percent of tetrafluoroethylene with 2 percent cure site monomer. The cure site monomer can also include those available from E.I. DuPont de Nemours, Inc. such as 4-bromoperfluorobutene-1,1,1-dihydro-4-bromoperfluorobutene-1,3-bromoperfluoropropene-1,1,1-dihydro-3-bromoperfluoropropene-1, or any other suitable, known, commercially available cure site monomers.

In various embodiments, the UV cured composite 201, 301, 401 as shown in FIGS. 2-4 can have a Young's modulus of at least about 500 MPa, or ranging from about 500 MPa to about 3,000 MPa, or from about 700 MPa to about 2,800 MPa or from about 800 MPa to about 2,500 MPa.

In various embodiments, the use of the UV cured composite 201, 301, 401 and the related UV curing processes using the disclosed UV curable coating composition for the imaging components 110, 122, 300, 400 can provide many advantages including, for example, low manufacturing cost, high production efficiencies such as having a short curing process, and low VOC (volatile organic compounds). In an additional example, the UV cured composite 201, 301, 401 for the exemplary imaging components 110, 122, 300, 400 can provide unique physical properties including, for example, resistance to stains, abrasions and solvents, coupled with superior toughness, and high gloss. Further, in certain embodiments, the UV cured composite 201, 301, 401 for intermediate transfer members 110 can be fabricated as seamless belts. Any other imaging component, such as, for example, a magnetic roller sleeve and a transfer belt can include the UV cured composite 201, 301, 401, in a configuration as shown in FIGS. 2, 3, and 4.

Examples are set forth herein below and are illustrative of different amounts and types of reactants and reaction conditions that can be utilized in practicing the disclosure. It will be apparent, however, that the disclosure can be practiced with other amounts and types of reactants and reaction conditions than those used in the examples, and the resulting devices various different properties and uses in accordance with the disclosure above and as pointed out hereinafter.

EXAMPLES

Example 1

Preparation of an ITB Member

About 10 g of STEPFAC® 8180, phosphate esters of alkyl polyethoxyethanol (Stepan Corporation, Northfield, Ill.) was mixed with about 76 g of SARTOMER® CN2901, urethane triacrylate oligomer ($T_g$=35° C., Sartomer, Exton, Pa.) and about 10 g of LAROMER® TMPTA, trimethyloipropane triacrylate monomer (BASF, Florham Park, N.J.). About 4 g of IRGACURE® 651, α, α-dimethoxy-α-phenylacetophenone photoinitiator (Ciba Specialty Chemicals, Tarrytown, N.Y.) was added to the acrylate and conductive species mixture to form a coating solution.

The coating was then coated on a glass plate using a draw bar coating method, and subsequently cured using a Hanovia UV instrument (Fort Washington, Pa.) for about 40 seconds at a wavelength of about 325 nm (about 125 watts). The UV cured composite film was then released from the glass plate and had a thickness of about 100 μm. The UV cured composite film was substantially clear with no phase separation.

Surface Resistivity Measurement

The ITB member of Example 1 was measured for surface resistivity (averaging four to six measurements at varying spots, 72° F./65% room humidity) using a High Resistivity Meter (Hiresta-Up MCP-HT450 available from Mitsubishi Chemical Corp.).

The surface resistivity was about $3.7\times10^{10}$ ohm/square, within the functional range of an ITB of from about $10^9$ to about $10^{13}$ ohm/square).

Young's Modulus Measurement

The ITB member of Example 1 was measured for Young's modulus following the ASTM D882-97 process. A sample of the ITB member of Example 1 (0.5 inch×12 inch×100 μm) was placed in the measurement apparatus, the Instron Tensile Tester, and then elongated at a constant pull rate until breaking. During this time, the instrument recorded the resulting load versus sample elongation. The modulus was calculated by taking any point tangential to the initial linear portion of this curve and dividing the tensile stress by the corresponding strain. The tensile stress was given by load divided by the average cross sectional area of the test specimen.

The Young's modulus of the ITB member of Example 1 was measured to be about 1,600 MPa, within the reported modulus range of the thermoplastic ITBs on the market (from about 1,000 to about 3,500 MPa). Examples of these commercially available thermoplastic ITBs are polyester/carbon black ITB (Ricoh, Young's modulus of about 1,200 MPa), polyamide/carbon black ITB (Brother, Young's modulus of about 1,100 MPa), and polyimide/polyaniline ITB (Xerox, Young's modulus of about 3,500 MPa).

While the present teachings have been illustrated with respect to one or more implementations, alterations and/or modifications can be made to the illustrated examples without departing from the spirit and scope of the appended claims. In addition, while a particular feature of the present teachings may have been disclosed with respect to only one of several implementations, such feature may be combined with one or more other features of the other implementations as may be desired and advantageous for any given or particular function. Furthermore, to the extent that the terms "including", "includes", "having", "has", "with", or variants thereof are used in either the detailed description and the claims, such terms are intended to be inclusive in a manner similar to the term "comprising." As used herein, the phrase "one or more of", for example, A, B, and C means any of the following: either A, B, or C alone; or combinations of two, such as A and B, B and C, and A and C; or combinations of three A, B and C. The term "at least one of" is used to mean one or more of the listed items can be selected.

Other embodiments of the present teachings will be apparent to those skilled in the art from consideration of the specification and practice of the present teachings disclosed herein. It is intended that the specification and examples be considered as exemplary only, with a true scope and spirit of the present teachings being indicated by the following claims.

What is claimed is:

1. An imaging component comprising:

an ultraviolet (UV) cured composite, the UV cured composite comprising a plurality of conductive species substantially uniformly dispersed in a UV cured polymer, wherein each of the plurality of conductive species is selected from a group consisting of esters of phosphoric acid and phosphonium salts, and wherein the UV cured composite has a surface resistivity in the range of about $10^8$ Ω/square to about $10^{13}$ Ω/square and a volume resistivity in the range of about $10^9$ Ωm to about $10^{14}$ Ωm.

2. The imaging component of claim 1, wherein the ultraviolet (UV) cured polymer comprises one or more repeat units selected from the group consisting of trimethylolpropane triacrylate, hexandiol diacrylate, tripropyleneglycol diacrylate, dipropyleneglycol diacrylate, triethyleneglycol divinyl ether, vinyl caprolactam, n-vinyl formamide, urethane acrylates, ester acrylates, epoxy acrylates, ether acrylates, olefin acrylates, and a combination thereof.

3. The imaging component of claim 1, wherein the plurality of conductive species are present in an amount ranging from about 1% to about 30% by weight of the total solid weight of the UV cured composite composition.

4. The imaging component of claim 1, wherein each of the plurality of conductive species is selected from the group consisting of phosphate esters of alkyl polyethoxyethanol, phosphate esters of alkylphenoxy polyethoxyethanol), phosphate esters of tridecyl alcohol ethoxylates, phosphate esters of alkyl phenol ethoxylates, tetradecyl(trihexyl)phosphonium chloride, tetradecyl(trihexyl)phosphonium decanoate, trihexyl(tetradecyl)phosphonium bis 2,4,4-trimethylpentylphosphinate, tetradecyl(trihexyl)phosphonium dicyanamide, triisobutyl(methyl)phosphonium tosylate, tetradecyl (trihexyl)phosphonium bistriflamide, tetradecyl(trihexyl) phosphonium hexafluorophosphate, tetradecyl(trihexyl) phosphonium tetrafluoroborate, and ethyl tri(butyl) phosphonium diethylphosphate.

5. The imaging component of claim 1, wherein the imaging component is in the form of at least one of a sheet, a belt, or a cylindrical roll.

6. The imaging component of claim 1 further comprising a substrate, such that the ultraviolet (UV) cured composite is disposed over the substrate.

7. The imaging component of claim 6, wherein the substrate comprises at least one of polystyrene, acrylic, styrene-acrylic copolymer, styrene-butadiene copolymer, polyamide, polyimide, polyethylene, polyethylene terephthalate, polyethylene naphthalate, polypropylene, polyvinyl chloride, polyester, polyurethane, polyvinyl alcohol, or vinyl ether resin.

8. The imaging component of claim 1 further comprising an outer layer disposed over the UV cured composite.

9. The imaging component of claim 1 further comprising:

a conformable layer disposed over the UV cured composite, wherein the conformable layer comprises one or more of neoprene, nitrile rubber, polyurethane rubber, epichlorohydrin rubber, and silicone rubber; and an outer release layer disposed over the conformable layer.

10. The imaging component of claim 1, wherein the UV cured composite has a volume resistivity in the range of about $10^9$ Ωm to about $10^{12}$ Ωm.

11. The imaging component of claim 1, wherein the UV cured composite has a modulus in the range of about 500 MPa to about 3,000 MPa.

12. The imaging component of claim 1, wherein the imaging component is selected from the group consisting of a bias charge roll, a bias transfer roll, a magnetic roller sleeve, an intermediate transfer belt, and a transfer belt.

13. A coating composition for imaging components comprising:

an ultraviolet (UV) curable resin, the UV curable resin comprising one or more of monomeric acrylates, monomeric vinyls, and oligomeric acrylates;

one or more photoinitiators; and a plurality of conductive species substantially uniformly dispersed in the UV curable resin, wherein each of the plurality of conductive species is selected from a group consisting of esters of phosphoric acid and phosphonium salts, wherein the coating composition has a volume resistivity in the range of about $10^9$ Ωm to about $10^{14}$ Ωm after the UV curable resin is cured.

14. The coating composition of claim 13, wherein the monomeric acrylate and monomeric vinyls are selected from the group consisting of trimethylolpropane triacrylate, hexandiol diacrylate, tripropyleneglycol diacrylate, dipropyleneglycol diacrylate, triethyleneglycol divinyl ether, vinyl caprolactam, n-vinyl formamide and a combination thereof.

15. The coating composition of claim 13, wherein the oligomeric acrylates are selected from the group consisting of urethane acrylates, polyester acrylates, epoxy acrylates, polyether acrylates, and olefin acrylates.

16. The coating composition of claim 13, wherein the oligomeric acrylates has a molecular weight ranging from about 300 to about 5,000.

17. The coating composition of claim 13, wherein each of the plurality of conductive species is selected from the group consisting of phosphate esters of alkyl polyethoxyethanol, phosphate esters of alkylphenoxy polyethoxyethanol), phosphate esters of tridecyl alcohol ethoxylates, phosphate esters of alkyl phenol ethoxylates, tetradecyl(trihexyl)phosphonium chloride, tetradecyl(trihexyl)phosphonium decanoate, trihexyl(tetradecyl)phosphonium bis 2,4,4-trimethylpentylphosphinate, tetradecyl(trihexyl)phosphonium dicyanamide, triisobutyl(methyl)phosphonium tosylate, tetradecyl (trihexyl)phosphonium bistriflamide, tetradecyl(trihexyl) phosphonium hexafluorophosphate, tetradecyl(trihexyl) phosphonium tetrafluoroborate, and ethyl tri(butyl) phosphonium diethylphosphate.

18. The coating composition of claim 13, wherein the plurality of conductive species are present in an amount ranging from about 1% to about 30% by weight of the total weight of the ultraviolet (UV) curable coating composition.

19. The coating composition of claim 13, wherein the one or more photoinitiators comprises one or more of a first photoinitiator for a surface curing of the UV curable resin and a second photoinitiator for a bulk curing of the UV curable resin.

20. The coating composition of claim 13, wherein the one or more photoinitiators comprises one or more of acyl phosphines, α-hydroxyketones, benzyl ketals, α-aminoketones, and mixtures thereof.

* * * * *